No. 720,228. PATENTED FEB. 10, 1903.
J. H. COUCH.
AUTOMATIC HOSE REEL ATTACHMENT.
APPLICATION FILED AUG. 28, 1902.

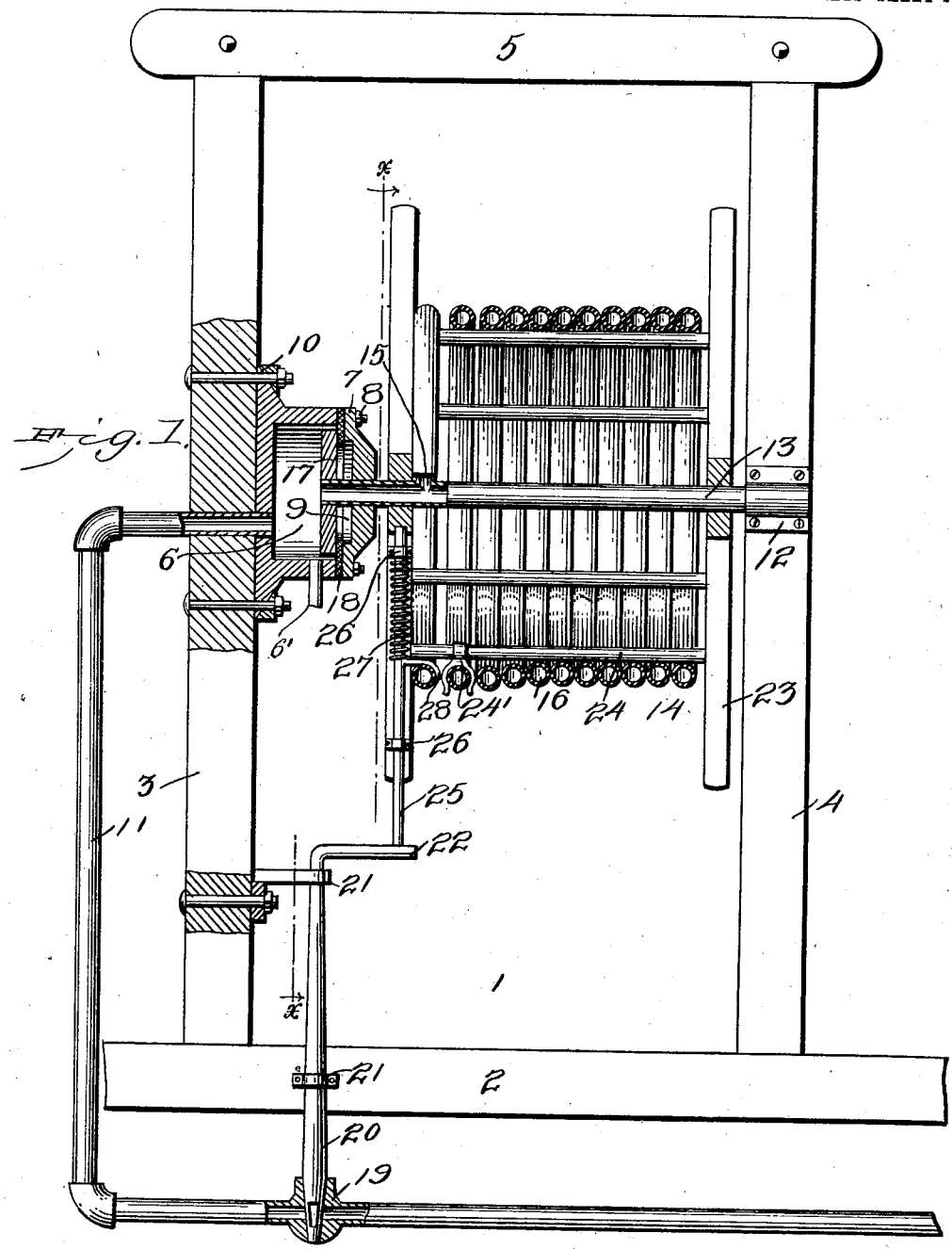

NO MODEL. 2 SHEETS—SHEET 2.

UNITED STATES PATENT OFFICE.

JAMES HOPSON COUCH, OF HANNIBAL, MISSOURI.

AUTOMATIC HOSE-REEL ATTACHMENT.

SPECIFICATION forming part of Letters Patent No. 720,228, dated February 10, 1903.

Application filed August 28, 1902. Serial No. 121,376. (No model.)

*To all whom it may concern:*

Be it known that I, JAMES HOPSON COUCH, a citizen of the United States, residing at Hannibal, in the county of Marion and State of Missouri, have invented a new and useful Automatic Hose-Reel Attachment, of which the following is a specification.

This invention resides in an improved automatic hose-reel apparatus for use in buildings and other places, and which is adapted to automatically turn on the water when the hose is unreeled, so that the hose may be instantly used for extinguishing fires and for other purposes; and it consists in the peculiar construction and combination of devices hereinafter fully set forth and claimed.

In the accompanying drawings, Figure 1 represents an elevation, partly in section, of an automatic hose-reel apparatus embodying these improvements. Fig. 2 represents a sectional view thereof taken on a plane indicated by the line $x\ x$ of Fig. 1.

The same reference-numerals indicate corresponding parts in both the figures.

In the embodiment of the invention a suitable support is provided, which is here shown as a frame 1, comprising a base 2, studs 3 4, which rise therefrom, and a plate 5, which connects the upper ends of the studs. On the inner side of the stud 3 is secured a pressure-chamber 6, which is here shown provided with a removable end 7, secured thereto by bolts or screws 8 and having a central opening 9 therein, which forms a bearing for one end of the hose-reel. The pressure-chamber 6 is here shown as secured to the post or stud 3 by means of flanges 10, which are bolted to said stud and are preferably made integral with said chamber. A bearing 12 is secured to the other stud or post 4. A pipe 13, which forms also the axle of the hose-reel 14 and is revoluble therewith, is journaled in the bearings 9 and 12 and is adapted for connection to the inner end of the hose 16, preferably by means of a nipple 15. At the inner end of the axle-pipe, which extends through the opening 9 in the end 7 of the pressure-chamber, is a head 17, which revolves with the axle-pipe. A gasket or other suitable packing 18 is disposed between the end 7 and the head 17 and extends up between the outer edge of the pressure-chamber 6 and the inner face of the end 7, the one gasket serving as a packing for the two joints. A water-pipe 11 discharges into the pressure-chamber 6 and is provided with a valve 19, including a turning-plug or valve-stem 20, by means of which water may be permitted to flow through the said pipe 11 or be cut off therefrom. The turning-plug 20 is journaled in suitable bearings 21, and is here shown as provided at its upper end with an operating-arm 22.

The hose-reel may be of any suitable construction. It is here shown as comprising a pair of spider-heads 23, connected together by bars 24, on which the hose may be wound or reeled. The bars 24 are preferably provided with spring-clips 24', disposed near the inner ends thereof in position to engage the second coil of the hose, and thereby exert a spring tension for preventing the hose from becoming accidentally disengaged from the detent now to be described. On one of the radial arms of the inner reel-head 23 is carried a longitudinally-movable tappet-rod 25, which operates in guides 26. This tappet-rod may be moved outwardly, so that it will lie in a plane intersected by the operating-arm 22 of the valve 19. A spring 27, which is here shown as a coiled extensile spring, on the said tappet-rod is adapted to move the rod into position to engage the operating-arm 22 of the valve, and thereby turn the valve and cause the water to be turned on when the last coil of hose is unwound from the reel. The said tappet-rod has a detent-arm 28, which projects laterally therefrom, and when the hose is wound on the reel the said detent-arm is engaged thereby near the inner end of the latter, preferably by the first coil wound on the reel, and the hose thus serves to maintain the tappet-rod in inoperative position against the tension of its springs. Normally the valve 19 is in such position as to cut off the flow of water through the pipe 11. When the hose is unreeled, the reel is revolved, and as the last coil of the hose leaves the reel it releases the detent-arm 28 of the tappet-rod, which rod under the tension of its spring 27 engages the arm 22 of the valve-stem 20 and causes it to make a quarter-turn, and thereby automatically turn on the water to the hose. The pressure of the water in the chamber 6 against the head 17 of the axle-pipe of the reel causes a watertight joint to be maintained between said head and the end 7 of the pressure-chamber, thereby preventing leakage through the bearing 9. Ordinarily this pressure-chamber is empty, and it is prevented from rusting by the air which enters it through the bearing 9 and around the head 17. Hence this improved apparatus is preserved against injury by corrosion when the same is not in use. The chamber 6 is preferably provided with a drain-pipe 6', having a suitable cock for drawing off the water remaining therein after the hose has been in use.

I do not desire to limit myself to the precise construction and combination of devices herein shown and described, as it is evident that modifications may be made therein without departing from the spirit and scope of my invention.

Having thus described my invention, I claim—

1. The combination of a water-pipe having a valve therein, a hose connected thereto, a revoluble reel on which said hose is wound, a spring-pressed tappet extending radially from said reel and having a detent for engaging the last coil of the hose wound on the reel, said tappet being set by its spring in position to engage and operate said valve when the detent is released, and yieldable means carried by said reel for engaging the coil adjacent the detent-engaging coil for avoiding the accidental release of said detent.

2. The combination of a pressure-chamber having one side thereof separable therefrom, a hose-reel having a pipe forming the axle thereof and adapted for attachment of a hose, said pipe extending into said pressure-chamber and having a pressure-controlled head mounted thereon within said chamber, a gasket clamped between the edges of the walls of said chamber and its separable member and the lower edge thereof being spaced from said pipe and disposed between said separable member and the outer edge of said pressure-head and adapted to be clamped between them, a valved water-pipe leading into said chamber, and a drain-pipe for the chamber.

In testimony that I claim the foregoing as my own I have hereto affixed my signature in the presence of two witnesses.

JAMES HOPSON COUCH.

Witnesses:
C. F. COOPER,
WM. R. COUCH.